United States Patent
Tian et al.

(10) Patent No.: US 11,037,593 B1
(45) Date of Patent: Jun. 15, 2021

(54) METHODS OF SEPARATING ONE OR MORE SUBSTRATES THAT ARE ADHESIVELY BONDED TO A CARRIER, AND RELATED SYSTEMS AND APPARATUSES

(71) Applicant: Seagate Technology LLC, Cupertino, CA (US)

(72) Inventors: Ruhai Tian, Eagan, MN (US); Gary M Singer, Northfield, MN (US); Peter J. Gunderson, Ellsworth, WI (US)

(73) Assignee: Seagate Technology LLC, Fremont, CA (US)

( * ) Notice: Subject to any disclaimer, the term of this patent is extended or adjusted under 35 U.S.C. 154(b) by 278 days.

(21) Appl. No.: 16/358,993

(22) Filed: Mar. 20, 2019

Related U.S. Application Data

(60) Provisional application No. 62/652,627, filed on Apr. 4, 2018.

(51) Int. Cl.
| | | |
|---|---|---|
| *G11B 5/00* | (2006.01) | |
| *B32B 7/00* | (2019.01) | |
| *G11B 5/84* | (2006.01) | |
| *G11B 5/31* | (2006.01) | |
| *B32B 7/06* | (2019.01) | |
| *B32B 7/12* | (2006.01) | |
| *G11B 5/82* | (2006.01) | |

(52) U.S. Cl.
CPC .................. *G11B 5/84* (2013.01); *B32B 7/06* (2013.01); *B32B 7/12* (2013.01); *G11B 5/3173* (2013.01); *G11B 5/82* (2013.01)

(58) Field of Classification Search
None
See application file for complete search history.

(56) References Cited

U.S. PATENT DOCUMENTS

| | | | |
|---|---|---|---|
| 6,687,976 B1 * | 2/2004 | Koyama | G11B 5/102 216/22 |
| 2008/0078077 A1 * | 4/2008 | Lee | G11B 5/102 29/603.06 |
| 2010/0323202 A1 * | 12/2010 | Burckhardt | C09J 175/12 428/423.1 |

FOREIGN PATENT DOCUMENTS

| | | |
|---|---|---|
| EP | 2773304 B1 | 3/2016 |
| WO | 2010146144 A2 | 12/2010 |

OTHER PUBLICATIONS

Chung et al., "Temporary Bonding Adhesive for Thin Wafer Handling", AI Technology, Inc., Sep. 9, 2016, (31 pages).

* cited by examiner

*Primary Examiner* — Jacob T Minskey
*Assistant Examiner* — Matthew Hoover
(74) *Attorney, Agent, or Firm* — Kagan Binder, PLLC

(57) ABSTRACT

The present disclosure relates to separating parts (e.g., sliders and/or row bars) from an adhesive and carrier during the manufacture of parts to be used in a data storage device such as a hard disc drive.

18 Claims, 4 Drawing Sheets

METHODS OF SEPARATING ONE OR MORE SUBSTRATES THAT ARE ADHESIVELY BONDED TO A CARRIER, AND RELATED SYSTEMS AND APPARATUSES

CROSS REFERENCE TO RELATED APPLICATION

This application claims the benefit of U.S. Provisional Patent Application Ser. No. 62/652,627, filed Apr. 4, 2018, wherein the entire disclosure of said application is incorporated herein by reference.

BACKGROUND

The present disclosure relates to separating parts such as row bars and sliders from an adhesive and carrier.

SUMMARY

Embodiments of the present disclosure include a method of processing at least one substrate comprising:
a) providing the at least one substrate adhesively bonded to a carrier member to define at least:
   i) a first interface between the at least substrate and an adhesive, and having a first bond strength; and
   ii) a second interface between the adhesive and the carrier member, and having a second bond strength,
wherein the adhesive has an adhesive strength, wherein a pre-determined force is established for separating the at least one substrate from the adhesive, and wherein the first bond strength and second bond strength are greater than the pre-determined force; and
b) exposing at least the first interface to a solvent composition for a time period to selectively reduce the first bond strength below the pre-determined force while not reducing the second bond strength below the pre-determined force.

DETAILED DESCRIPTION

During manufacture of a part (e.g., a slider), at least one surface of a substrate can be temporarily, adhesively bonded to a carrier member. This arrangement of substrate, adhesive layer, and carrier is sometimes referred to as a "stack". By temporarily bonding a substrate to a carrier to form a stack, one or more manufacturing operations can be performed on the substrate while it is mounted on and bonded to the carrier. In some embodiments, one or more manufacturing operations can be performed on the substrate while it is temporarily mounted to the carrier (e.g., in the manufacture of a slider to be used in a hard disk drive). For example, a wafer can be processed using a wide variety of techniques such as photolithography and the like. The wafer can be sliced into a plurality of row bars, which is a one dimensional array of sliders. A row bar can be further processed (e.g., one or more lapping steps) and diced into a plurality of individual sliders. Individual sliders can include a transducer, which is used for read/write operations in a hard disk drive. The surface of a substrate that is in contact with the adhesive can be selected as desired. For example, it may be desirable to protect the surface in contact with the adhesive while the substrate is being processed and/or while the opposite surface of the substrate is being processed. Substrates can be made out of a wide variety of materials and sizes used in data storage devices (e.g., hard disc drives). For example, a substrate can be made out of conductive materials, insulator materials, semiconductor materials, and combinations thereof. For example, a substrate can include alumina titanium-carbide (also referred to as AlTiC).

The present disclosure can be used with a wide variety of adhesives that are used to temporarily bond a part such as a substrate to a carrier. In some embodiments, the adhesives can be referred to as "temporary part-bonding adhesives" because the adhesive is used to only temporarily bond a part (substrate) to a carrier so that the part can subjected to one or more manufacturing processes. At a desired point in the manufacturing process, the part can be separated from the carrier and the adhesive. In some embodiments, an adhesive is chosen from a polyurethane, a polyacrylate, wax-based adhesives, cyanoacrylate, and combinations thereof.

The present disclosure can be used to separate a wide variety of substrates that are adhesively bonded to a carrier. As used herein, separating a part (e.g., a substrate) from a carrier can also be referred to as "dismounting" or "de-bonding" the part from an adhesive and a carrier.

In some embodiments, a substrate is chosen from a wafer, one or more row bars of sliders, one or more sliders, and combinations thereof. The bulk of a slider can be made out of ceramic material such as alumina titanium-carbide.

Figure 1:
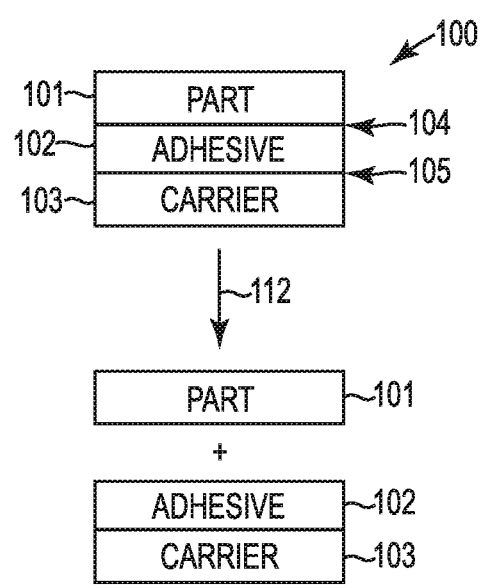
FIG. 1 shows a schematic flow diagram of an embodiment according to the present disclosure for separating a part from an adhesive layer.

An example of a part (e.g., substrate) adhesively bonded to carrier is illustrated in FIG. 1 as "stack" 100. In some embodiments, stack 100 includes at least a carrier 103, a part 101 (e.g., substrate), and an adhesive layer 102. It is noted that in some embodiments adhesive layer 102 could be less extensive than as shown. For example, one or more strips of an adhesive could be used to bond part 101 to carrier 103. As shown in FIG. 1, adhesively bonding part 101 to carrier 103 defines a first interface 104 between the part 101 (e.g., substrate) and the adhesive layer 102. The first interface 104 has a first bond strength between the part 101 and the adhesive layer 102. The bond strength of first interface 104 is a measure of the adhesive force (attractive force) among the part 101 and adhesive layer 102. As shown in FIG. 1, adhesively bonding part 101 to carrier 103 also defines a second interface 105 between the adhesive layer 102 and the carrier 103. The second interface 105 has a second bond strength between the carrier 103 and the adhesive layer 102. The bond strength between the carrier 103 and the adhesive layer 102 is a measure of the adhesive force (attractive force) among the carrier 103 and adhesive layer 102.

The adhesive that bonds part 101 to carrier 103 has an "adhesive strength." The adhesive strength refers to the cohesion of the adhesive, which is the attractive force among adhesive molecules.

At a desired point during the processing of part 101, part 101 can be separated from the adhesive layer 102 and carrier 103 so that the part 101 can be further processed.

To facilitate separating part 101 from the adhesive layer 102 and carrier 103 according to the present disclosure, the adhesive layer 102 can be exposed to a solvent composition to swell the adhesive layer 102 and selectively weaken the first bond strength of the first interface 104 as compared to the second bond strength of the second interface 105.

In some embodiments, methods according to the present disclosure include exposing at least the first interface 104 (e.g., the whole stack 100) to a solvent composition for a time period to selectively reduce the first bond strength below a pre-determined force while not reducing the second bond strength below the pre-determined force. A pre-determined force can be determined (established) for separating a part 101 such as a substrate from the adhesive layer 102 after exposing the adhesive layer 102 to the solvent composition. As used herein, a predetermined force refers to the force that is greater than the first bond strength after solvent exposure as described herein and is used to move the part 101 from the adhesive layer 102 so that, if desired, the part 101 can be moved to another location after drying the adhesive layer 102 that has been exposed to a solvent composition for a desired time period. Non-limiting examples of techniques for moving (separating) part 101 from adhesive layer 102 include using one or more tools to move the part 101 by hand or automated machinery. Examples of tools include transfer tape, mechanical "fingers" or "tweezers", vacuum nozzles, combinations of these, and the like. Moving a part 101 from adhesive layer 102 is further discussed below.

Figure 2:
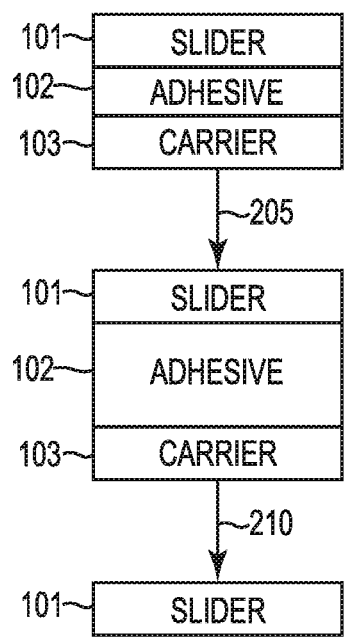
FIG. 2 shows a schematic flow diagram of an embodiment according to the present disclosure and illustrating that the adhesive swells.
Figure 3:
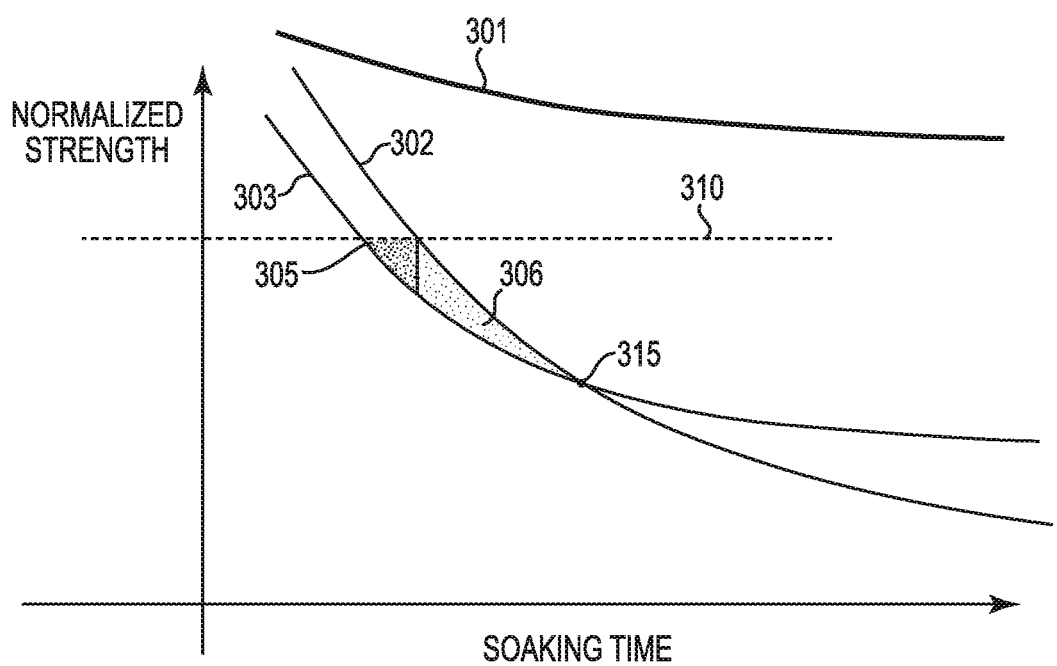
FIG. 3 shows a graph illustrating soaking with a solvent composition according to the present disclosure.

An example of exposing an adhesive to a solvent composition to facilitate separating a part from an adhesive and carrier according to the present disclosure is illustrated with respect to FIGS. 1-3.

FIG. 3 is a graph showing an example of normalized strength versus soaking time for stack 100 and a solvent composition. As shown in FIGS. 1 and 3, the adhesive layer 102 has an adhesive strength 302, the first interface 104 between the part 101 and the adhesive layer 102 has a first bond strength 303, and the second interface 105 between the adhesive layer 102 and the carrier 103 has a second bond strength 301. FIG. 3 also shows a constant, pre-determined force 310 for separating part 101 from the adhesive layer 102. If desired, a bond strength can be quantified using a rheometer. Adhesive strengths can be reported in adhesive data sheets.

As can be seen in FIG. 3, before exposing stack 100 to a solvent composition, the first bond strength 303, the second bond strength 301, and adhesive strength 302 are greater than the pre-determined force 310. At this stage, the predetermined force 310 does not tear the adhesive layer 102 and does not cause the interfaces 104 and 105 to separate. Also, before exposing stack 100 to the solvent composition, the adhesive strength 302 is less than the second bond strength 301, and the first bond strength 303 is less than the adhesive strength 302.

As the stack 100 is exposed (e.g., soaked) in a solvent composition, the first bond strength 303 is selectively reduced below the pre-determined force 310 while the second bond strength 301 is not reduced below the pre-determined force 310. FIG. 2 shows a schematic flowchart illustrating a process of exposing a stack 100 to a solvent composition according to the present disclosure. Referring to FIG. 2, stack 100 is exposed to a solvent composition at step 205, thereby causing the adhesive layer 102 to swell and selectively weaken the first bond strength 303 of the first interface 104 between the part 101 and the adhesive layer 102 as compared to the second bond strength 301 of the second interface 105 between the adhesive layer 102 and the carrier 103.

As can be seen in FIG. 3, as the stack is soaked in the solvent composition, the first bond strength 303 is reduced below the predetermined force 310 into region 305, while the adhesive strength 302 is reduced but remains greater than predetermined force 310 and the first bond strength 303. Region 305 can be a desirable target when formulating a solvent composition for a given soaking time because the first bond strength has the lowest strength, which can allow part 101 to be separated from adhesive layer 102. In region 305, the part 101 can be separated from the adhesive layer 102. Because the adhesive strength 302 is greater than the pre-determined force 310 (pick up force) and the second bond strength 301 is greater than the pre-determined force 310, as well as the adhesive strength 301, the adhesive layer 102 tends to have a "clean" break from part 101 and does not tear when separating the part 101 from the adhesive layer 102 and carrier 103.

As shown in FIG. 3, as the stack 100 continues to soak in the solvent composition, the first bond strength 303 continues to reduce and the adhesive strength 302 reduces to region 306. In region 306, the adhesive strength 302 is equal to or less than the predetermined force 310, and the adhesive strength 302 is still greater than the first bond strength 303. Region 306 can be a target when formulating a solvent composition for a given soaking time because the first bond strength 303 has the lowest strength. But, because the adhesive strength 302 is equal to or less than the predetermined force 310 there is a chance that the adhesive layer 102 may tear, which can be undesirable for cleanliness reasons. Because of this, region 305 can be a relatively more desirable region than region 306 when formulating a solvent composition according to the present disclosure.

In some embodiments, as shown in FIG. 3, depending on the particular adhesive and solvent composition, as the stack 100 continues to soak in the solvent composition the adhesive strength 302 may become less than the first bond strength 303, which can increase the chance that adhesive layer 102 tears. Unfortunately, when the adhesive layer 102 tears at least some of the adhesive can remain adhered to the part 101. Adhesive remaining on part 101 after solvent soaking can result in increased processing time and cost to remove the adhesive.

In some embodiments, substantially none of the adhesive layer 102 is dissolved when a stack 100 is exposed to a solvent composition as described herein such that adhesive is not redeposited on the part 101 to an undue degree after the part 101 is separated from the adhesive layer 102. If an adhesive is dissolved to an undue degree, it can redeposit on a part 101 to an undue degree, thereby increasing processing time and cost to remove the redeposited adhesive. Further, any part handling due to cleaning, e.g., sonication and/or other agitation that may be used to remove adhesive from part 101 may cause part deformation, part shift and/or or collision with other hard surfaces, which can cause undue mechanical damage.

After soaking, but prior to separating the part 101 from adhesive layer 102, the first bond strength 303 can be high enough to permit the part 101 to remain adhered to the adhesive layer 102 until the adhesive layer 102 is dried and the part 101 separated and transferred from adhesive layer 102. Because the adhesive layer 102 is not dissolved, the part 101 can remain on the adhesive layer 102 until transfer occurs so that part 101 is not "loose". Loose parts tend to move around and contact other surfaces (e.g., other parts), which can cause mechanical damage.

A solvent composition according to the present disclosure can be formulated to selectively weaken a part/adhesive interface in a desirable time period as described herein so that the part can be separated from the adhesive layer without dissolving the adhesive to an undue degree (e.g., substantially no adhesive dissolves in the solvent composition) and without adhesive remaining adhered to the part.

In some embodiments, the solvent composition can be formulated with two or more solvents. In some embodiments, the solvent composition is a mixture of at least a first solvent and a second solvent that are miscible in each other. In some embodiments, depending on the adhesive the first solvent can dissolve the adhesive layer when the first solvent is the only solvent ("dissolving" solvent) and the second solvent cannot dissolve the adhesive layer when the second solvent is the only solvent ("non-dissolving" solvent). In some embodiments, the adhesive can have a solubility of greater than 1% by weight, greater than 10% by weight, greater than 20% by weight, greater than 30% by weight, greater than 40% by weight, or even greater than 50% by weight in the first solvent (dissolving solvent). In some embodiments, the adhesive can have a solubility less than 0.01% by weight, or even less than 0.005% by weight in the second solvent (non-dissolving solvent).

In some embodiments, the first solvent and second solvent are present in the solvent composition in a volumetric ratio so that the solvent composition dissolves substantially no adhesive, yet can selectively weaken the bond strength between the part and the adhesive in a desirable time period. For example, the first solvent and second solvent can be present in a volumetric ratio in the range of 1:99 to 99:1. By controlling the ratio of these two types of solvents in a solvent composition (mixture), the solubility of the adhesive can be manipulated so that the adhesive does not dissolve to an undue degree, but instead permits the adhesive to remain bonded to the carrier while the part is "picked" off of the adhesive layer.

A wide variety of solvents that can be included in a solvent composition according to the present disclosure. As mentioned above, one of more factors such as adhesive composition and/or soaking time can determine how to select each solvent. In some embodiments (e.g., when the adhesive is a polyurethane and/or cyanoacrylate), a first solvent (dissolving solvent) can include one or more organic solvents that can dissolve the selected adhesive. In some embodiments, a nonlimiting example of a dissolving organic solvent includes one or more ketones such as acetone, 2-butanone, 2-pentanone, combinations of these, and the like. In some embodiments (e.g., when the adhesive is a polyurethane and/or cyanoacrylate), a second solvent (non-dissolving solvent) can include water, one or more alcohols (e.g., isopropyl alcohol), combinations of these, and the like. In some embodiments, the solvent composition includes a mixture of ketone, and water and/or IPA. In some embodiments, the solvent composition includes one or more ketones present in a total amount of 30-70 percent by weight of the solvent composition, and water and/or IPA present in an amount from 30-70 percent by weight of the solvent composition. In some embodiments, the solvent composition includes water and/or IPA, and acetone, for example, acetone present in an amount of 30-70 percent by weight of the solvent composition, and water and/or IPA present in an amount from 30-70 percent by weight of the solvent composition.

A solvent composition can be formulated so that the first bond strength 303 is selectively weakened as described herein within a desirable time period. In some embodiments, the adhesive can be soaked for a time period of 8 hours or less, 4 hours or less, 2 hours or less, 1 hour or less, 30 minutes or less, or even 15 minutes or less. In some embodiments, the adhesive can be soaked for a time period of 15 to 120 minutes, or even from 20 to 90 minutes.

A solvent composition can be at any desired temperature while the adhesive composition is exposed to the solvent composition. For example, in some embodiments, the solvent composition can be at a temperature during soaking that does not cause undue evaporation, thereby causing the solvent composition profile to change to an undue degree. In some embodiments, a solvent composition forms an azeotrope and the solvent composition is at a temperature that is less than the boiling point of the azeotrope while the first interface is exposed to the solvent composition. In some embodiments, a solvent composition includes two or more solvents and does not form an azeotrope. In such embodiments, the solvent composition can be at a temperature that is less than the lowest boiling point of the two or more solvents while the first interface is exposed to the solvent composition. In some embodiments, the solvent composition can be at a temperature in a range of 10° C. to 90° C., 15° C. to 50° C., or even 20° C. to 40° C. while the first interface is exposed to the solvent composition.

An adhesive composition can be exposed to solvent composition as described herein in any desirable manner. In some embodiments, a stack such as stack 100 can be completely submerged in a solvent composition for a desired time period. In some embodiments, a stack such as stack 100 can be sprayed with a solvent composition for a desired time period. In some embodiments, a stack such as stack 100 can be exposed to a solvent composition vapor for a desired time period.

Optionally, a solvent composition according to the present disclosure can include one or more additives. Exemplary additives include anticorrosion agents, antifouling agents, combinations of these and the like.

After soaking stack 100 in a solvent composition for a desired time period, the stack 100 can be dried to evaporate at least a portion of the solvent composition (e.g., substantially all) and part 101 can be separated from adhesive layer 102. In some embodiments, the stack 100 can be exposed to ambient air for a desired period of time to evaporate the solvent composition.

As mentioned above, because the adhesive layer 102 is not dissolved, the part 101 can remain on the adhesive layer 102 until transfer occurs so that part 101 is not "loose". Loose parts to move around and contact other surfaces (e.g., other parts), which can cause mechanical damage. In some embodiments, as described below with respect to FIG. 5, the first bond strength 303 can be greater than zero to facilitate keeping part 101 in position on the adhesive layer 102 until the pre-determined transfer force 310 is applied to part 101 to separate part 101 from adhesive layer 102 and transfer part 101 to another location. As shown in FIG. 1, dried part 101 is shown as being separated 112 from adhesive layer 102 while substantially all of the adhesive layer 102 remains bonded to the carrier 103. Similarly, as shown in FIG. 2, dried part 101 is shown as being separated 210 from adhesive layer 102. In some embodiment, no detectable adhesive residue is present on part 101 after part 101 is separated from adhesive layer 102. In some embodiments, a trace amount of adhesive material may be present on the part 101 after part 101 is separated from adhesive layer 102.

EXAMPLE 1

Example 1 illustrates formulating a solvent composition for use in swelling a polyurethane (PU) adhesive to selectively weaken the interface between the polyurethane and the part.

Figure 4:
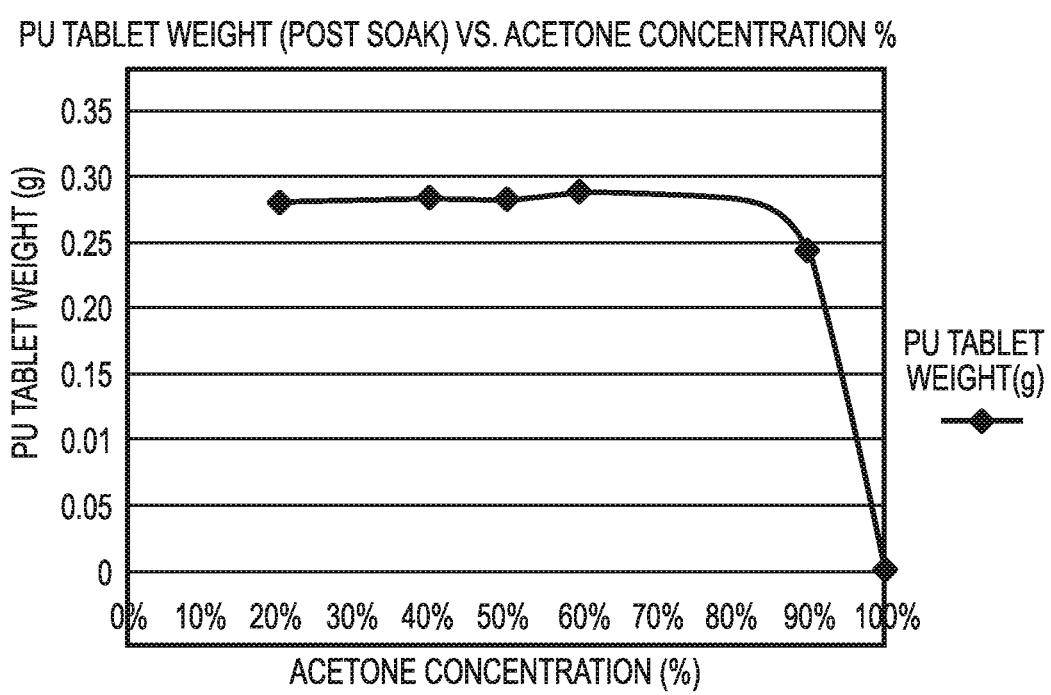
FIG. 4 shows a graph illustrating how a solvent composition can be formulated according to the present disclosure.

FIG. 4 shows results of soaking a PU tablet in water/acetone mixtures having various percentages of water and acetone at about room temperature (approximately 25° C.) (note: the soaking temperature can be adjusted as desired for a given solvent composition). The soaking time in each formulation is 5 hours. As shown in the figure, the tablet does not lose weight when it is soaking in a formulation which contains <70% (w %) acetone indicating the PU does not dissolve. When the acetone concentration is higher than 80%, the tablet starts to dissolve. In pure acetone (100%), the tablet dissolves quickly indicating complete dissolving of the PU tablet. Therefore to minimize the dissolving of PU, the acetone concentration in the formulation is controlled to <80% (w %). On the other hand, when the acetone concentration is too low the PU cannot be sufficiently swelled or it may take very long (days) to swell. Considering the efficiency and cost, the acetone concentration can be as close to 80% (w %) as possible to the point where the PU dissolves, but without dissolving PU to an undue degree.

EXAMPLE 2

Figure 5:
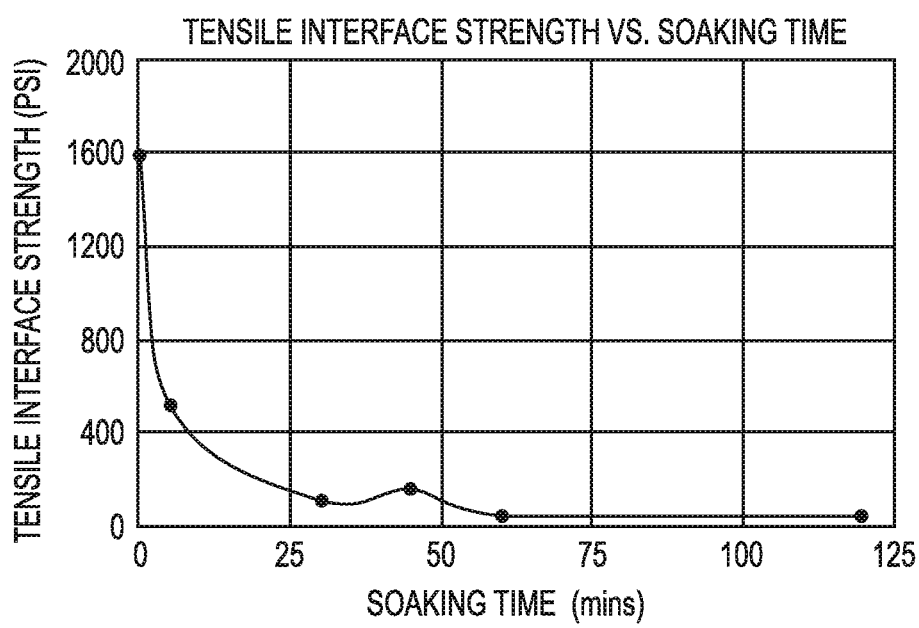
FIG. 5 is a graph shown tensile strength versus soaking time.

Example 2 evaluated the tensile interface strength of Polyurethane-AlTiC versus the soaking time in a solvent composition. As shown in FIG. 5, the interface strength reduces to 5% of the initial strength after soaking for 60 minutes in 40% water/60% acetone by weight of the solvent composition at approximately 25° C. This study shows the strength of the Polyurethane-Slider interface can be manipulated by soaking in a solvent composition.

EXAMPLE 3

Example 3 demonstrated that diced sliders could be cleanly separated from an adhesive layer, while the adhesive layer remained adhered to a carrier.

A stack including diced sliders mounted on a carrier with a PU adhesive layer was soaked in a solvent mixture ("SM") according to the present disclosure for ~60 mins. The solvent mixture included 40% water/60% acetone by weight of the solvent mixture at approximately 25° C. For comparison purposes, a stack of diced sliders mounted on a carrier with a PU adhesive layer was soaked in pure acetone for ~60 mins.

After soaking and drying the stack, the sliders were transferred onto a pressure sensitive adhesive (PSA) tape. The adhesive layer was left on the carrier surface without dissolving. Under a microscope the adhesive layer showed the footprint of the backpad surface of a slider. The sliders on the transfer tape were in an ordered matrix and did not scramble. This facilitates slider sorting from a tape to a tray. The sliders can also be inspected and sorted into a tray directly. The backside of a slider (the surface that contacts the adhesive during dicing) was examined and showed a clean surface, which is an indication of the interface breaking between the adhesive and the slider.

Table 1 below summarizes the comparison between the solvent mixture and pure acetone. Using the solvent mixture has advantages as compared to the pure acetone. Compared to using pure acetone, using the solvent mixture produced cleaner parts by avoiding the material re-deposition, and also resulted in higher yield by avoiding the mechanical collision and much higher units per hour (UPH) (330% improvement estimate) by avoiding the slider scramble. Using the solvent mixture according to the present disclosure to swell the adhesive and selectively weaken the adhesive/part interface has demonstrated a transferring rate of 99.7%.

TABLE 1

| Solvent | Pure acetone | SM |
|---|---|---|
| Adhesive dissolves | Yes | No |
| Redeposition of adhesive contamination | Yes | No |
| Sonication during soaking | Yes | No |
| Inter-slider collision during soaking (mechanical damages) | Yes | No |
| Slider quality screen before sorting | No | Yes |
| Soaking time | 40 min-60 mins | 40 min-60 mins |

EXAMPLE 4

Example 4 evaluated separating row bars of sliders from an adhesive layer and carrier using a solvent soaking method according to the present disclosure. A 2×2 carrier with 42 bars mounted thereon with cyanoacrylate adhesive (CA) was used. The CA filled the gaps between the row bars. The Bar-CA interface was weakened by soaking the carrier and bars in a solvent mixture of 20% water/80% acetone by weight of the solvent mixture at approximately 25° C. for 60 minutes. The bars were then slid off and the CA residue was left on the carrier surface.

What is claimed is:

1. A method of processing at least one substrate comprising:
   a) providing the at least one substrate adhesively bonded to a carrier member to define at least:
      i) a first interface between the at least substrate and an adhesive, and having a first bond strength; and
      ii) a second interface between the adhesive and the carrier member, and having a second bond strength, wherein the adhesive has an adhesive strength, wherein a pre-determined force is established for separating the at least one substrate from the adhesive, and wherein the first bond strength and second bond strength are greater than the pre-determined force; and
   b) exposing at least the first interface to a solvent composition for a time period to selectively reduce the first bond strength below the pre-determined force while not reducing the second bond strength below the pre-determined force.

2. The method of claim 1, wherein the exposing at least the first interface to a solvent composition for a time period does not reduce the adhesive strength below the pre-determined force.

3. The method of claim 1, wherein the exposing at least the first interface to a solvent composition for a time period also reduces the adhesive strength below the pre-determined force while not reducing the adhesive strength below the first bond strength.

4. The method of claim 1, wherein the solvent composition comprises a mixture of at least a first solvent and a second solvent, wherein first solvent can dissolve the adhesive and the second solvent cannot dissolve adhesive, and wherein the first solvent and second solvent are present in a volumetric ratio so that the solvent composition dissolves substantially no adhesive.

5. The method of claim 4, wherein the adhesive has a solubility of greater than 10 percent by weight in the first solvent, and wherein the adhesive has a solubility of less than 0.01 percent by weight in the second solvent.

6. The method of claim 1, wherein the solvent composition comprises one or more dissolving solvents present in a total amount of 30-70 percent by weight of the solvent composition, and one or more non-dissolving solvents present in an amount of 30-70 percent by weight of the solvent composition.

7. The method of claim 6, wherein the one or more dissolving solvents comprise one or more ketones, and the one or more non-dissolving solvents are chosen from water, isopropyl alcohol, and mixtures thereof.

8. The method of claim 1, wherein the solvent composition comprises water and acetone.

9. The method of claim 1, wherein the solvent composition is at a temperature in the range of 15° C. to 50° C. while the first interface is exposed to the solvent composition.

10. The method of claim 1, wherein the solvent composition forms an azeotrope, and wherein the solvent composition is at a temperature less than the boiling point of the azeotrope while the first interface is exposed to the solvent composition.

11. The method of claim 1, wherein the solvent composition comprises two or more solvents, wherein the solvent composition does not form an azeotrope, and wherein the solvent composition is at a temperature less than the lowest boiling point of the two or more solvents while the first interface is exposed to the solvent composition.

12. The method of claim 1, wherein the adhesive is chosen from a polyurethane, a polyacrylate, a cyanoacrylate, a wax-based adhesive, and combinations thereof.

13. The method of claim 1, wherein the time period is 120 minutes or less.

14. The method of claim 1, wherein the solvent composition does not dissolve the adhesive composition while the first interface is exposed to the solvent composition for the time period.

15. The method of claim 1, further comprising drying at least the at least one substrate to remove the solvent composition, wherein the first bond strength is greater than zero so that the at least one semiconductor remains in position in contact with the adhesive.

16. The method of claim 15, further comprising separating the at least one substrate from the adhesive.

17. The method of claim 16, wherein substantially all of the adhesive remains bonded to the carrier member.

18. The method of claim 1, wherein the at least one substrate is chosen from a wafer, one or more row bars of sliders, one or more sliders, and combinations thereof.

* * * * *